United States Patent
Yadav et al.

(10) Patent No.: US 11,970,956 B2
(45) Date of Patent: Apr. 30, 2024

(54) PITCH CHANGE MECHANISM FOR A FAN OF A GAS TURBINE ENGINE

(71) Applicant: General Electric Company, Schenectady, NY (US)

(72) Inventors: Abhijeet Jayshingrao Yadav, Karad (IN); Nicholas Joseph Kray, Mason, OH (US); Nitesh Jain, Bengaluru (IN); Ricardo Hernandez Pandeli, Queretaro (MX)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/146,511

(22) Filed: Dec. 27, 2022

(65) Prior Publication Data
US 2024/0068373 A1 Feb. 29, 2024

(30) Foreign Application Priority Data
Aug. 26, 2022 (IN) .............. 202211048815

(51) Int. Cl.
*F01D 7/00* (2006.01)
(52) U.S. Cl.
CPC .................... *F01D 7/00* (2013.01)
(58) Field of Classification Search
CPC ......... F01D 7/00; B64C 27/605; B64C 11/30; B64C 11/32
See application file for complete search history.

(56) References Cited

U.S. PATENT DOCUMENTS

| | | | |
|---|---|---|---|
| 5,154,580 A * | 10/1992 | Hora ................ | B64C 11/32 416/129 |
| 5,242,265 A * | 9/1993 | Hora ................ | B64C 11/32 416/129 |
| 8,235,324 B1 | 8/2012 | Birch et al. | |

(Continued)

FOREIGN PATENT DOCUMENTS

FR 3109766 A1 11/2021

OTHER PUBLICATIONS

Kufmann et al., Individual Blade Control of a 5-Bladed Rotor Using the Multiple Swashplate System, 43$^{rd}$ European Rotorcraft Forum, Milano Italy, Sep. 12-15, 2017, 17 Pages.

(Continued)

*Primary Examiner* — Topaz L. Elliott
*Assistant Examiner* — Ryan C Clark
(74) *Attorney, Agent, or Firm* — Dority & Manning, P.A.

(57) ABSTRACT

A gas turbine engine including: a turbomachine having a compressor section, a combustion section, and a turbine section arranged in serial flow order; a fan defining a fan axis and comprising a plurality of fan blades rotatable about the fan axis; and a pitch change mechanism operable with the plurality of fan blades, the pitch change mechanism including a plurality of linkages, the plurality of linkages including a first linkage coupled to a first fan blade of the plurality of fan blades and a second linkage coupled to a second fan blade of the plurality of fan blades; and a non-uniform blade actuator system operable with one or more of the plurality of linkages to control a pitch of the first fan blade relative to a pitch of the second fan blade.

20 Claims, 8 Drawing Sheets

(56) References Cited

U.S. PATENT DOCUMENTS

| | | | |
|---|---|---|---|
| 8,985,954 B2* | 3/2015 | Balk | F02K 3/02 |
| | | | 415/129 |
| 9,169,735 B2 | 10/2015 | Stamps | |
| 10,077,102 B1 | 9/2018 | Birch et al. | |
| 10,221,706 B2* | 3/2019 | Niergarth | F02K 3/06 |
| 10,272,998 B2* | 4/2019 | Zachary | B64C 11/36 |
| 10,288,083 B2* | 5/2019 | Miller | F01D 7/00 |
| 10,358,207 B2 | 7/2019 | Miller et al. | |
| 10,443,412 B2* | 10/2019 | Niergarth | B64C 11/44 |
| 10,654,558 B2 | 5/2020 | Choi et al. | |
| 10,960,969 B2 | 3/2021 | Choi et al. | |
| 2015/0285262 A1* | 10/2015 | Fabre | F04D 29/668 |
| | | | 416/1 |
| 2017/0174341 A1* | 6/2017 | Avery | B64C 27/625 |
| 2018/0339770 A1 | 11/2018 | Brunken et al. | |
| 2019/0263502 A1* | 8/2019 | Miller | B64C 27/605 |
| 2020/0407044 A1 | 12/2020 | Wilson | |
| 2022/0371721 A1* | 11/2022 | Boudebiza | B64C 11/308 |

OTHER PUBLICATIONS

Neuheuser et al., Assessment of Power Consumption of Helicopter Flight Control Systems Without Swashplate, Recent Advances in Aerospace Actuation System and Components, Toulouse, France, Nov. 24-26, 2004, 5 Pages.

Norman et al., Full-Scale Wind Tunnel Test of a UH-60 Individual Blade Control System for Performance Improvement and Vibration, Loads, and Noise Control, Computer Science, May 27, 2009, 20 Pages. https://rotorcraft.arc.nasa.gov/Publications/files/Norman_09AHS_IBC_Final_reva.pdf.

* cited by examiner

PITCH CHANGE MECHANISM FOR A FAN OF A GAS TURBINE ENGINE

PRIORITY INFORMATION

The present application claims priority to Indian Patent Application Number 202211048815 filed on Aug. 26, 2022.

FIELD

The present disclosure related to a pitch change mechanism for a fan of a gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. In at least certain configurations, the turbofan engine may include an outer nacelle surrounding a plurality of fan blades of a fan of the fan assembly. The outer nacelle may provide benefits relating to noise and blade containment. However, inclusion of the outer nacelle may limit a diameter of the fan of the fan assembly, as with a larger diameter fan a size and weight of the outer nacelle generally increases as well.

Accordingly, certain turbofan engines may remove the outer nacelle. However, the inventors of the present disclosure have found that certain problems may arise with such a configuration, and that solutions to such problems would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
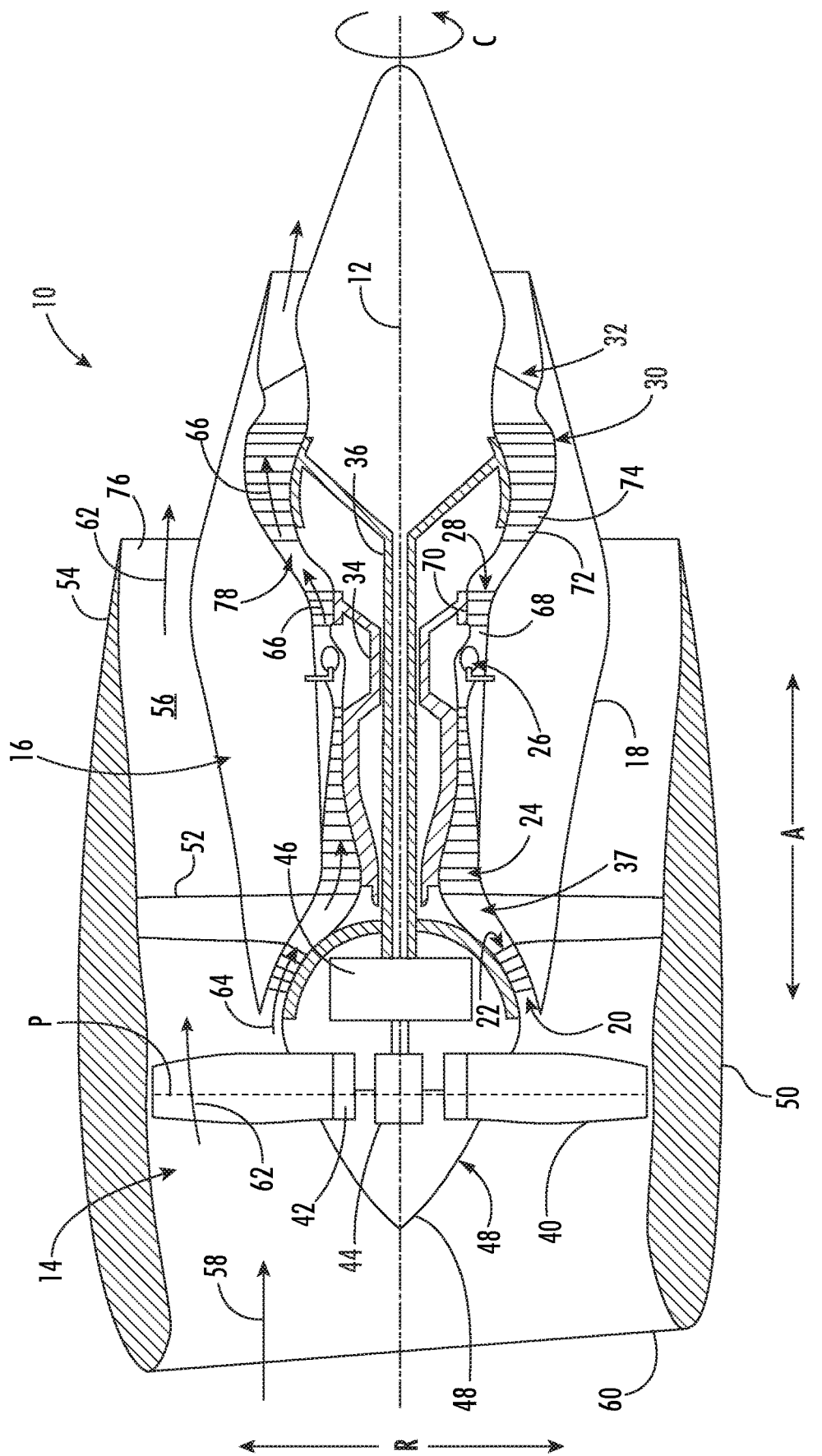
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The present disclosure is generally related to an actuation assembly for a fan assembly of a gas turbine engine and a gas turbine engine including the same. In at least certain exemplary embodiments, the fan assembly may be an unducted fan assembly, i.e., may not include an outer nacelle surrounding the fan assembly. During certain operations, an airflow may be received by the fan assembly that is misaligned with a fan axis of the fan assembly. For example, during operations where the gas turbine engine defines a high angle of attack, such as a takeoff or climb operation, the airflow received by the fan may be misaligned with the fan axis. Similarly, during low speed operations where there is a strong cross-wind, the airflow received by the fan may be misaligned with the fan axis. With such a configuration, the misaligned airflow may cause the fan blades at one side of the engine to have a higher loading than on an opposite side of the engine, causing undesirable forces to be enacted on the fan assembly and gas turbine engine at least once per revolution of the fan assembly (also referred to as "1P" loads).

In order to address this issue, the inventors have come up with a pitch change mechanism operable with the plurality of fan blades capable of varying the pitch of individual fan blades relative to other fan blades, such that the pitch of fan blades at one circumferential position are different than the pitch of the remaining fan blades. The pitch of the individual fan blades may change based on the circumferential position of the fan blades to even out forces on the fan assembly and gas turbine engine despite an incoming airflow that is misaligned with the fan axis.

In particular, the pitch change mechanism may include a plurality of linkages, the plurality of linkages including a first linkage coupled to a first fan blade of the plurality of fan blades and a second linkage coupled to a second fan blade of the plurality of fan blades; and a non-uniform blade actuator system operable with one or more of the plurality of linkages to control a pitch of the first fan blade relative to a pitch of the second fan blade. In such a manner, the pitch change mechanism may change a pitch of the fan blades individually based, e.g., on a circumferential position of the fan blades even out forces on the fan assembly and gas turbine engine despite an incoming airflow that is misaligned with the fan axis.

Referring now to the drawings, wherein identical numerals indicate the same elements throughout the Figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal axis 12 provided for reference), a radial direction R, and a circumferential direction C extending about the longitudinal axis 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gearbox 46, and the fan blades 40, disk 42, and pitch change mechanism 44 are together rotatable about the longitudinal axis 12 by LP shaft 36 across the power gearbox 46. The power gearbox 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by rotatable front hub 48 of the fan section 14 (sometimes also referred to as a "spinner"), the front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the outer nacelle 50 is supported relative to the turbomachine 16 by a plurality of circumferentially-spaced outlet guide vanes 52 in the embodiment depicted. Moreover, a downstream section 54 of the outer nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the outer nacelle 50 and fan section 14. As the volume of air 58 passes across the fan blades 40, a first portion of air 62 is directed or routed into the bypass airflow passage 56 and a second portion of air 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gearbox 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
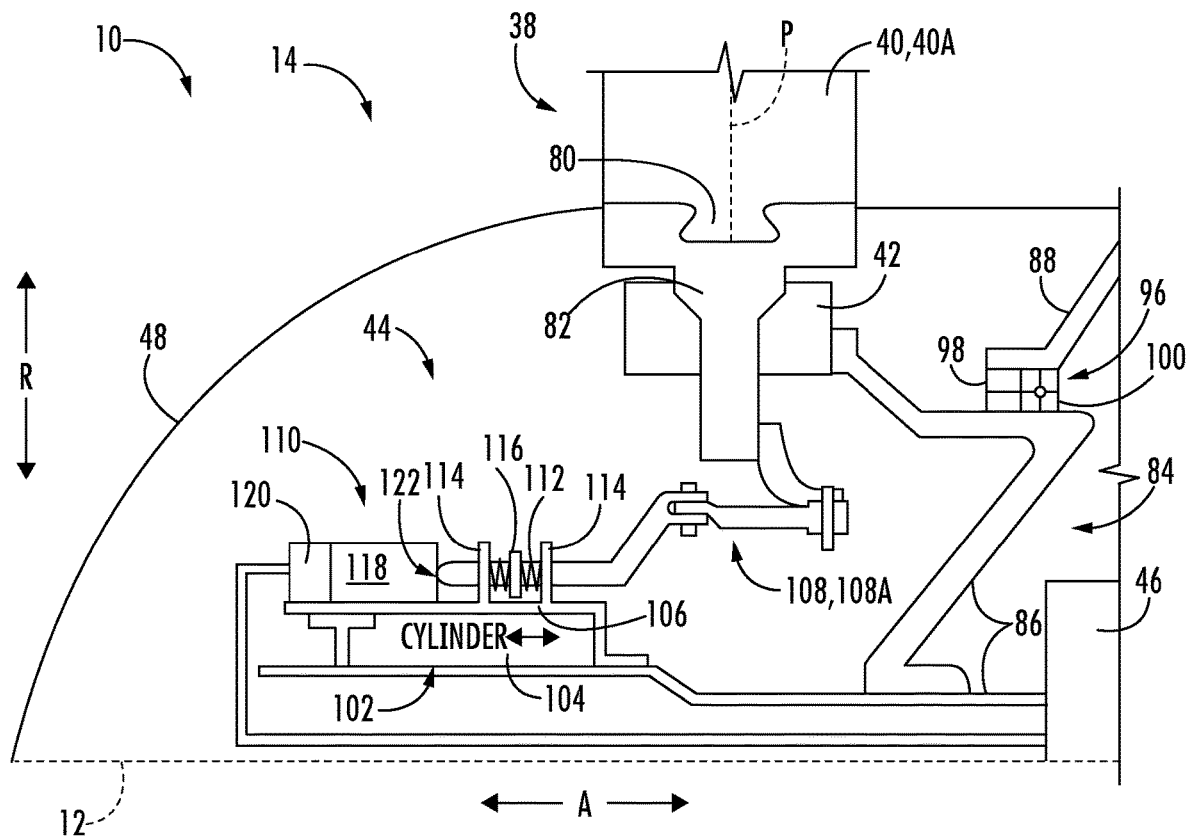
FIG. 2 is a schematic, cross-sectional view of a forward end of the exemplary gas turbine engine of FIG. 1.

Referring now to FIG. 2, a schematic, cross-sectional view of a forward end of a gas turbine engine 10 in accordance with an exemplary embodiment of the present disclosure is provided. Specifically, FIG. 2 provides a schematic, cross-sectional view of a fan section 14 of the gas turbine engine 10. In certain exemplary embodiments, the exemplary gas turbine engine 10 of FIG. 2 may be configured in substantially the same manner as exemplary gas turbine engine 10 of FIG. 1. Accordingly, the same or similar numbering may refer to the same or similar part.

As depicted in FIG. 2, the fan section 14 (also referred to herein as a "fan assembly") generally includes a fan 38 configured as a variable pitch fan having a plurality of fan blades 40 40 coupled to a disk 42. Briefly, it will be appreciated that the fan 38 is configured as a forward thrust fan configured to generate thrust for the gas turbine engine 10 (and, e.g., an aircraft incorporating the gas turbine engine 10) in a forward direction. The "forward direction" may correspond to a forward direction of an aircraft incorporating the gas turbine engine 10, and in the embodiment depicted in FIG. 2 is a direction pointing to the left.

Referring still to FIG. 2, each fan blade 40 includes a base 80 at an inner end along a radial direction R. Each fan blade 40 is coupled at the base 80 to the disk 42 via a respective trunnion mechanism 82. The trunnion mechanism 82 facilitates rotation of a respective fan blade 40 about a pitch axis P of the respective fan blades 40. For the embodiment depicted, the base 80 is configured as a dovetail received within a correspondingly shaped dovetail slot of the trunnion mechanism 82.

However, in other exemplary embodiments, the base 80 may be attached to the trunnion mechanism 82 in any other suitable manner. For example, the base 80 may be attached to the trunnion mechanism 82 using a pinned connection, or any other suitable connection. In still other exemplary embodiments, the base 80 may be formed integrally with the trunnion mechanism 82.

Further, as with the exemplary gas turbine engine 10 of FIG. 1, the fan 38 of the exemplary gas turbine engine 10 depicted in FIG. 2 is mechanically coupled to a turbomachine 16 (not depicted in the example of FIG. 2, see FIG. 1). More particularly, the exemplary fan 38 of the gas turbine engine 10 of FIG. 2 is rotatable about a longitudinal axis 12 of the gas turbine engine 10 by an LP shaft 36 (not depicted in the example of FIG. 2, see FIG. 1) across a power gearbox 46. Specifically, the disk 42 is attached to the power gearbox 46 through a fan rotor 84, which includes one or more individual structural members 86 for the embodiment depicted. The power gearbox 46 is, in turn, attached to the LP shaft 36 (not depicted in the example of FIG. 2, see FIG. 1), such that rotation of the LP shaft correspondingly rotates the fan rotor 84 and the plurality of fan blades 40. Notably, as is also depicted, the fan section 14 additionally includes a front hub 48 (which is rotatable with, e.g., the disk 42 and plurality of fan blades 40).

Moreover, the fan 38 additionally includes a stationary fan frame 88 and one or more fan bearings 96 for supporting rotation of the various rotating components of the fan 38, such as the plurality of fan blades 40. More particularly, the fan frame 88 supports the various rotating components of the fan 38 through the one or more fan bearings 96. For the embodiment depicted, the one or more fan bearings 96 includes a forward roller bearing 98 and an aft ball bearing 100. However, in other exemplary embodiments, any other suitable number and/or type of bearings may be provided for supporting rotation of the plurality of fan blades 40. For example, in other exemplary embodiments, the one or more fan bearings 96 may include a pair (two) tapered roller bearings, or any other suitable bearings.

Additionally, the exemplary fan 38 of the gas turbine engine 10 includes a pitch change mechanism 44 for rotating each of the plurality of fan blades 40 about their respective pitch axes P.

In particular, for the exemplary embodiment depicted, the pitch change mechanism 44 includes a master control 102 configured to rotate with the plurality of fan blades 40 of the fan 38. In the embodiment depicted, the master control 102 is coupled to the fan rotor 84, such that the master control 102 is rotatable with the fan rotor 84 and the plurality of fan blades 40 of the fan 38. The master control 102 includes a cylinder 104 and an outer wall 106. As will be appreciated, the outer wall 106 may be a substantially annular outer wall extending in the circumferential direction C substantially completely around the longitudinal axis 12 of the gas turbine engine 10. Briefly, it will be appreciated that the longitudinal axis 12 is aligned with the fan axis for the embodiment depicted, and the terms may be used interchangeably with respect to the embodiment depicted.

The cylinder 104 is configured to move the outer wall 106 along the axial direction A of the gas turbine engine 10. In such a manner, it will be appreciated that the cylinder 104 may be configured as a linear actuator. In at least certain exemplary aspects, the cylinder 104 may be a pneumatic cylinder, a hydraulic cylinder, or an electrically actuated cylinder. Additionally, or alternatively, the master control 102 may include any other suitable configuration for moving the outer wall 106 along the axial direction A.

Further for the embodiment depicted in FIG. 2, the pitch change mechanism 44 includes a plurality of linkages 108 coupled to the plurality of fan blades 40 (e.g., each linkage 108 of the plurality of linkages 108 coupled to a respective fan blade 40 of the plurality of fan blades 40). In particular, for the embodiment depicted in FIG. 2, the plurality of linkages 108 are further coupled to the master control 102, such that each linkage 108 of the plurality of linkages 108 may extend from the master control 102 to the respective fan blade 40 of the plurality of fan blades 40. For example, in the embodiment of FIG. 2, the fan blade 40 depicted may be a first fan blade 40A, and the linkage 108 depicted may be a first linkage 108A of the plurality of linkages 108. The first linkage 108A is coupled to the master control 102 unit extends to, and is coupled to, the first fan blade 40A. Each of the plurality of fan blades 40 and each of the respective plurality of linkages 108 may be arranged along the circumferential direction C and may be configured in a similar manner as exemplary first linkage 108A and first fan blade 40A depicted in FIG. 2 (see, e.g., FIG. 1).

In such a manner, it will be appreciated that the master control 102 may be configured to engage each linkage 108 of the plurality of linkages 108 simultaneously to change a pitch of each fan blade 40 of the plurality of fan blades 40 simultaneously and, e.g., in unison.

In addition to the master control 102, it will be appreciated that for the embodiment depicted in FIG. 2, the pitch change mechanism 44 further includes a non-uniform blade actuator system 110. The non-uniform blade actuator system 110 is generally configured to change a pitch of at least one fan blade 40 relative to the other fan blades 40 of the plurality fan blades 40. For the exemplary embodiment depicted in FIG. 2, it will be appreciated that such a functionality is enabled at least in part due to the coupling of the plurality of linkages 108 to the master control 102. More specifically, for the embodiment shown in FIG. 2, each linkage 108 of the plurality of linkages 108 is movably coupled to the master control 102 through one or more biasing members 112. More specifically, still, for the embodiment shown in FIG. 2, the outer wall 106 of the master control 102 includes a pair of radial walls 114 spaced from one another along the axial direction A. With respect to the first linkage 108A, the first linkage 108A extends through the pair of radial walls 114 and includes a stopper 116 positioned between the pair of radial walls 114. The first linkage 108A further includes the one or more biasing members 112 coupling the stopper 116 to the pair of radial walls 114 to, in turn, couple the first linkage 108A to the master control 102. Such a configuration may allow for the first linkage 108A to be moved along the axial direction A relative to the master control 102 during at least certain operations by the non-uniform blade actuator system 110, as will be described in more detail below.

Further, for the embodiment shown in FIG. 2, the non-uniform blade actuator system 110 includes a pitch ring 118 extending along the circumferential direction C and one or more pitch ring actuators 120 configured to move the pitch ring 118 generally along the axial direction A. As will be appreciated, the pitch ring 118 is slidably engaged with the plurality of linkages 108. In particular, each linkage 108 of the plurality of linkages 108 includes a distal end 122, the distal end 122 contacting the pitch ring 118 during at least certain operations.

Briefly, it will be appreciated that for the embodiment depicted in FIG. 2, the non-uniform blade actuator system 110 is configured to remain stationary relative to the fan 38 in the circumferential direction C. More specifically, the non-uniform blade actuator system 110 does not rotate on the circumferential direction C with the fan 38. For the embodiment depicted in FIG. 2, the non-uniform blade actuator system 110 is mounted through the power gearbox 46 to facilitate such configuration.

Figure 3:
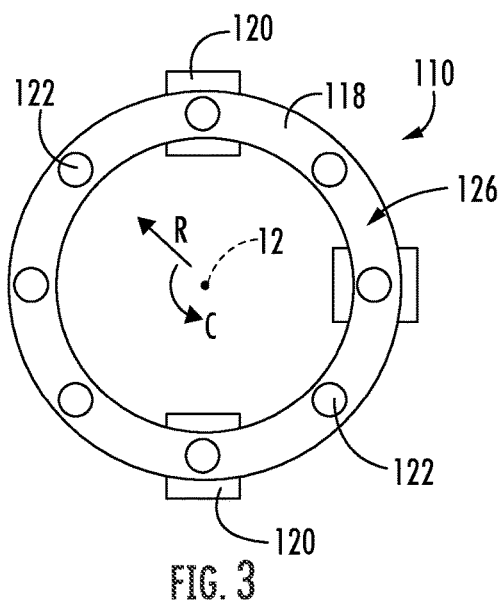
FIG. 3 is a schematic view of a portion of a non-uniform blade actuator system in accordance with an exemplary aspect of the present disclosure, as viewed along a longitudinal axis of a gas turbine engine.

Referring briefly to FIG. 3, a view of a portion of the non-uniform blade actuator system 110 is depicted, as viewed along the longitudinal axis 12 of the gas turbine engine 10. As will be appreciated from the view of FIG. 3, the pitch ring 118 extends along the circumferential direction C, and more specifically for the embodiment shown extends 360 degrees ("°") in the circumferential direction C. The pitch ring 118 may be configured to contact the distal end 122 of each linkage 108 of the plurality of linkages 108 during at least certain exemplary operations, as discussed below. Further for the embodiment shown in FIG. 3, the one or more pitch ring actuators 120 includes a pair of pitch ring actuators 120 configured to move the pitch ring 118 in unison along the longitudinal axis 12.

Figure 4:
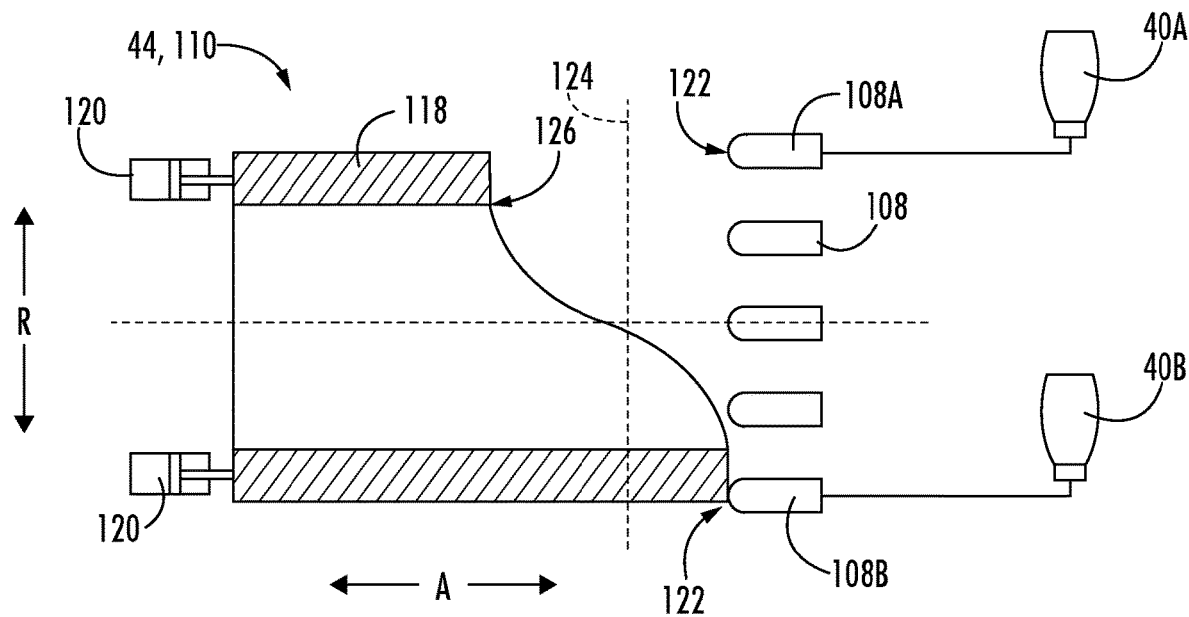
FIG. 4 is a close-up, schematic view of a portion of the non-uniform blade actuator system and a fan of the exemplary gas turbine engine of FIG. 2, with the non-uniform blade actuator system provided in a disengaged position.

Referring now to FIG. 4, a close-up, schematic view of a portion of the non-uniform blade actuator system 110 and the fan 38 of FIG. 2 is provided in a disengaged position.

Briefly, it will be appreciated that as is depicted schematically in the example of FIG. 4, the plurality of fan blades 40 includes the first fan blade 40A, and further includes a second fan blade 40B. Further, the plurality of linkages 108 includes the first linkage 108A coupled to the first fan blade 40A and a second linkage 108B coupled to the second fan blade 40B. Although not depicted in FIG. 4, it will be appreciated at least from the view of FIG. 2 and the description herein, the first linkage 108A is further coupled to the master control 102 and the first fan blade 40A, and the second linkage 108B is similarly coupled to the master control 102 and the second fan blade 40B.

As is depicted in FIG. 4, when the non-uniform blade actuator system 110 is in the disengaged position, the plurality of linkages 108 are positioned in a biased position dictated by a position of the master control 102 and the respective one or more biasing members 112 coupling the plurality of linkages 108 to the master control 102 (see FIG. 2). In such a manner, it will be appreciated that the non-uniform blade actuator system 110 is not affecting a pitch of any of the plurality fan blades 40 when the non-uniform blade actuator system 110 is in the disengaged position. In particular, for the embodiment shown in FIG. 4, the pitch ring 118 of the non-uniform blade actuator system 110 is spaced from the distal ends 122 of each of the plurality of linkages 108 of the pitch change mechanism 44. As such, each fan blade 40 of the plurality fan blades 40 may define a uniform pitch angle when the non-uniform blade actuator system 110 is in the disengaged position.

Figure 5:
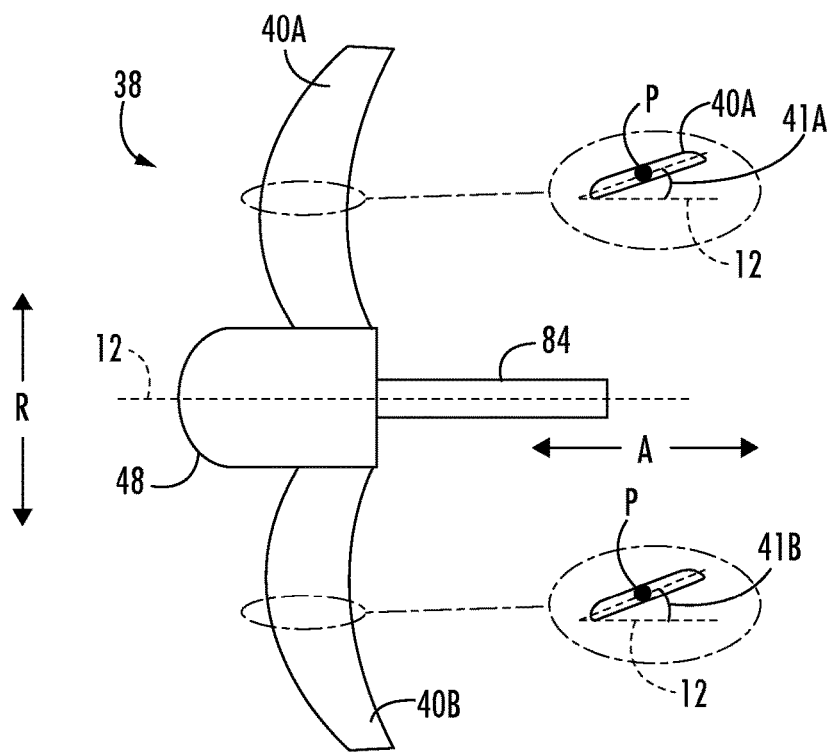
FIG. 5 is a schematic view of the fan of the exemplary gas turbine engine of FIG. 2 with the non-uniform blade actuator system in the position of FIG. 4.

For example, referring also to FIG. 5, providing a schematic view of the fan 38 with the non-uniform blade actuator system 110 in the position of FIG. 4 (the disengaged position), it will be appreciated that with such a configuration, the first fan blade 40A defines a first pitch angle 41A and the second fan blade 40B defines a second pitch angle 41B. For the embodiment of FIGS. 4 and 5, the first pitch angle 41A is equal to the second pitch angle 41B. Such is depicted schematically in the callout circles of FIG. 5 showing a view along the respective pitch axes P.

Figure 6:
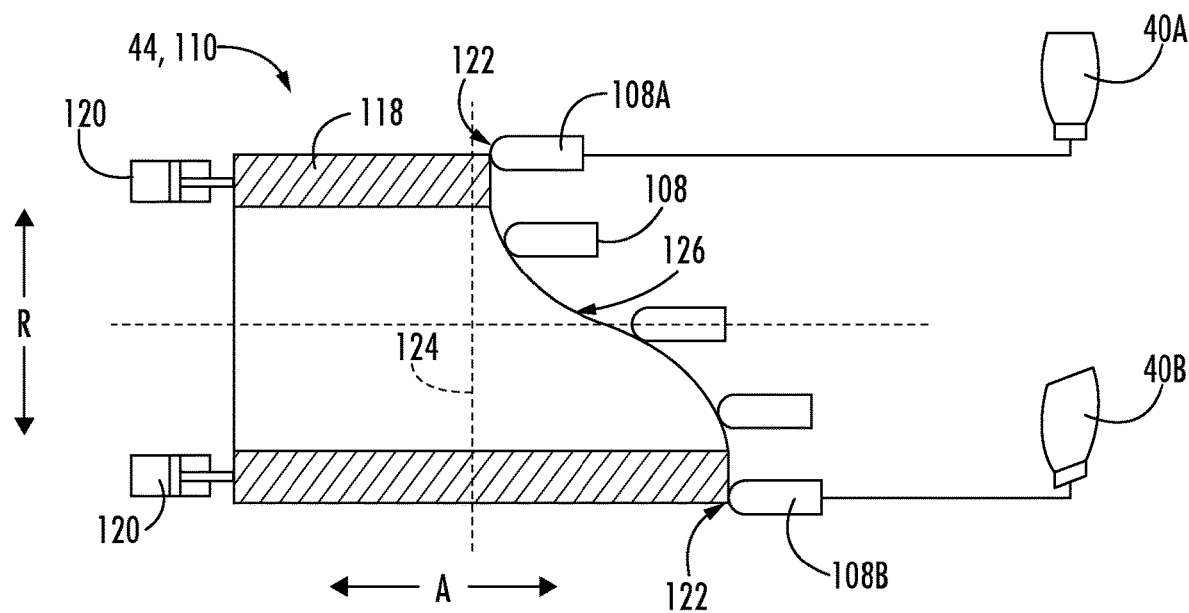
FIG. 6 is a close-up, schematic view of a portion of the non-uniform blade actuator system and a fan of the exemplary gas turbine engine of FIG. 2, with the non-uniform blade actuator system provided in an engaged position.

By contrast, referring now to FIG. 6, a close-up, schematic view of a portion of the non-uniform blade actuator system 110 and fan 38 of FIG. 2 is provided in an engaged position. When in the engaged position, the non-uniform blade actuator system 110 is operable with one or more of the plurality of linkages 108 to control the pitch of the first fan blade 40A relative to the pitch of the second fan blade 40B.

As depicted in FIG. 6, when the non-uniform blade actuator system 110 is in the engaged position, the plurality of linkages 108 are offset from their biased positions (i.e., the neutral position shown, e.g., in FIG. 2). In particular, it will be appreciated that the fan 38 defines a reference plane 124 perpendicular to the longitudinal axis 12 of the gas turbine engine 10. The pitch ring 118 of the non-uniform blade actuator system 110 defines an interface surface 126 configured to slidably engage with the distal ends 122 of the plurality of linkages 108 when the non-uniform blade actuator system 110 is moved to the engaged position. The interface surface 126 defines a non-uniform geometry relative to the reference plane 124. In such a manner, although the one or more pitch ring actuators 120 are configured to move the pitch ring 118 along the longitudinal axis 12 in a uniform manner, the interface surface 126 of the pitch ring 118 is configured to vary a pitch of at least one fan blade 40 relative to the other fan blades 40.

Figure 7:
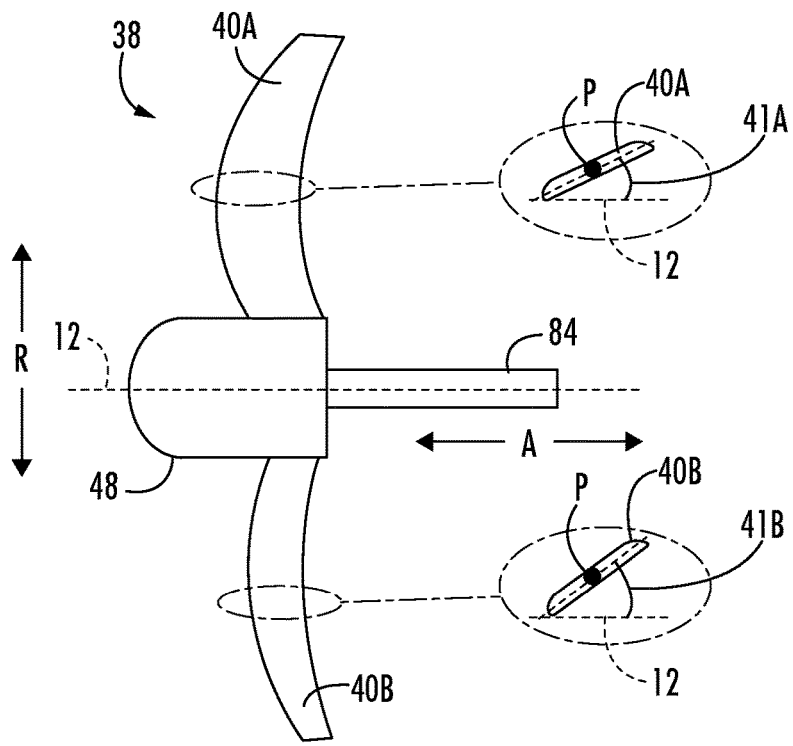
FIG. 7 is a schematic view of the fan of the exemplary gas turbine engine of FIG. 2 with the non-uniform blade actuator system in the position of FIG. 6.

In particular, referring now to FIG. 7, providing a schematic view of the fan 38 with the non-uniform blade actuator system 110 in the engaged position of FIG. 6, it will be appreciated that with such a configuration, the first fan blade 40A defines the first pitch angle 41A and the second fan blade 40B defines the second pitch angle 41B. For the embodiment of FIGS. 6 and 7, the first pitch angle 41A is different than the second pitch angle 41B. Such is depicted schematically in the callout circles of FIG. 7 showing a view along the respective pitch axes P.

As will be appreciated, when the gas turbine engine 10 of FIGS. 1 through 7 is operated across various operating conditions, during one or more of these operating conditions, an airflow into the fan 38 may be oblique relative to the longitudinal axis 12, e.g., defining an angle between about 5 degrees and about 60 degrees. With such an operating condition, the fan blades 40 may experience different loads at different locations along the circumferential direction C, also referred to as a 1P load. Relatively high 1P loads may result in undesirable and premature wearing of various components of the fan 38 and gas turbine engine 10 through high cycle fatigue of one or more of such components. One example of such a situation may be during a takeoff operating condition, where the gas turbine engine 10 defines a relatively high angle of attack relative to an oncoming airflow.

It will be appreciated, however, that inclusion of a pitch change mechanism 44 in accordance with one or the exemplary embodiments described herein may allow for the fan 38 to accommodate airflow into the fan 38 at such an oblique angle. In particular, by moving the non-uniform blade actuator system 110 to the engaged position (see FIGS. 6 and 7), the non-uniform blade actuator system 110 may rotate the plurality of fan blades 40 to different pitch angles at different circumferential locations at every rotation of the fan 38, with the different pitch angles configured to minimize the 1P loads on the fan 38 and other components. More specifically, the non-uniform blade actuator system 110 may rotate the plurality of fan blades 40 to different pitch angles based on the circumferential position of the fan blades 40 such that the forces on the fan section of the gas turbine engine 10 are more equally distributed circumferentially to minimize any 1P loads experienced during an operating condition with an airflow into the fan 38 at such an oblique angle.

As the gas turbine engine 10 transitions to an operating condition less susceptible to the high 1P loads, such as a cruise operating condition with a relatively low angle of attack relative to the incoming airflow, the non-uniform blade actuator system 110 may be moved to the disengaged position (see FIGS. 5 and 6), such that the master control 102 dictates uniform pitch angles for each of the plurality fan blades 40 of the fan 38.

The exemplary non-uniform blade actuator system 110 described above with reference to FIGS. 2 through 7 is provided by way of example only. In other exemplary embodiments, the pitch change mechanism 44 may have any other suitable non-uniform blade actuator system 110 operable with one or more of the plurality of linkages 108 to control the pitch of a first fan blade 40A relative to the pitch of the second fan blade 40B within the plurality of fan blades 40 of the fan 38.

For example, referring now generally to FIGS. 8 through 11, schematic views of a non-uniform blade actuator system 110 in accordance with another exemplary embodiment of the present disclosure are provided. The exemplary non-uniform blade actuator system 110 of FIGS. 8 through 11 may be incorporated into the pitch change mechanism 44 of the gas turbine engine 10 of FIGS. 1 and 2, and may generally be configured and a similar manner as the exemplary non-uniform blade actuator system 110 of FIGS. 3 through 7. In such a manner, it will be appreciated that the non-uniform blade actuator system 110 of FIGS. 8 through 11 generally includes a pitch ring 118 and one or more pitch ring actuators 120.

Figure 8:
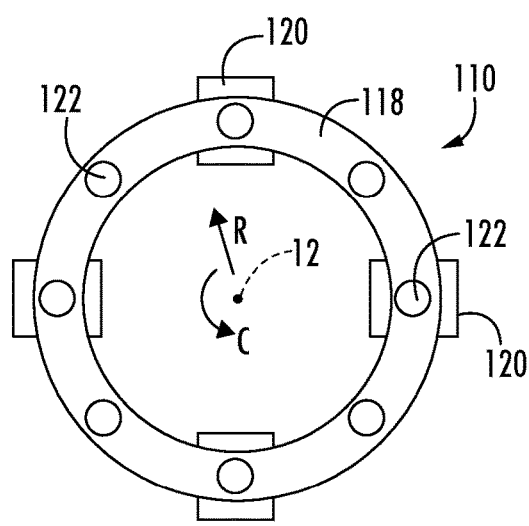
FIG. 8 is a close-up, schematic view of a portion of a non-uniform blade actuator system in accordance with an exemplary aspect of the present disclosure, provided along a longitudinal axis of a gas turbine engine.

For example, referring particularly to FIG. 8, a view of the non-uniform blade actuator system 110 is provided along a longitudinal axis 12 of the gas turbine engine 10. As with the embodiment described above, the pitch ring 118 of the non-uniform blade actuator system 110 of FIG. 8 is configured to slidably engage with distal ends 122 of a plurality of linkages 108 of the pitch change mechanism 44 (see also, e.g., FIG. 2). More specifically, for the embodiment depicted in FIG. 8, the pitch ring 118 defines an interface surface 126 configured to slidably engage with the distal ends 122 of the plurality of linkages 108 of the pitch change mechanism 44.

For the embodiment depicted in FIG. 8, the one or more pitch ring actuators 120 includes at least three pitch ring actuators 120, and more particularly includes four pitch ring actuators 120.

Figure 9:
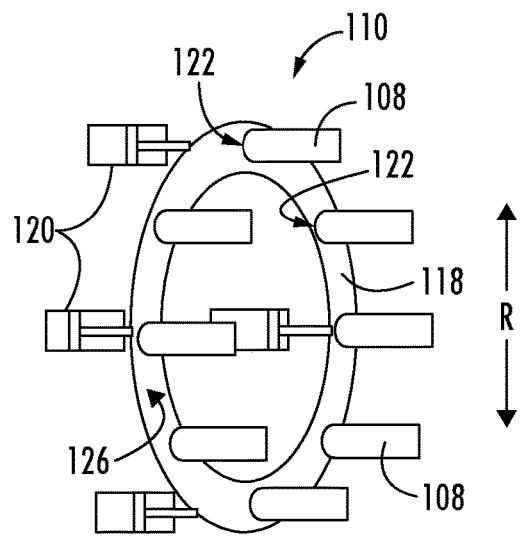
FIG. 9 is a perspective view of the non-uniform blade actuator system of FIG. 8.

Referring now also the FIG. 9, a perspective view of the exemplary pitch ring 118 and pitch ring actuators 120 of the non-uniform blade actuator system 110 is provided. As will be appreciated, by including four pitch ring actuators 120, the pitch ring 118 may be articulated to any desired orientation relative to a reference plane 124 extending perpendicular to the longitudinal axis 12 of the gas turbine engine 10.

Figure 10:
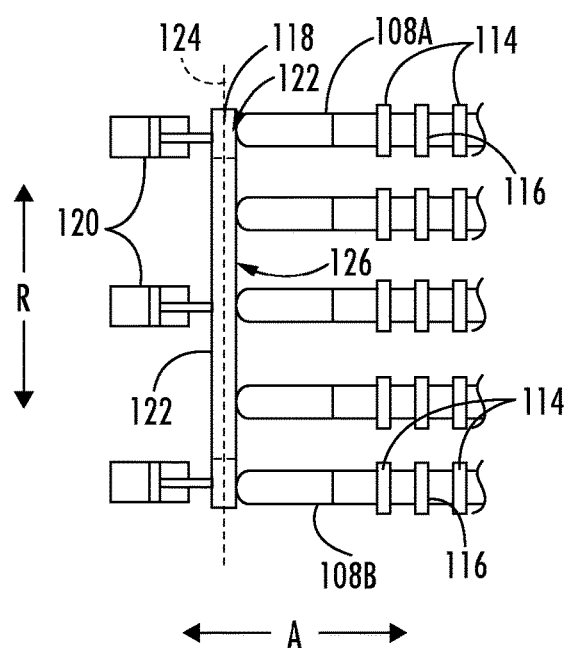
FIG. 10 is a side, schematic view of the non-uniform blade actuator system of FIG. 8 in a neutral position.
Figure 11:
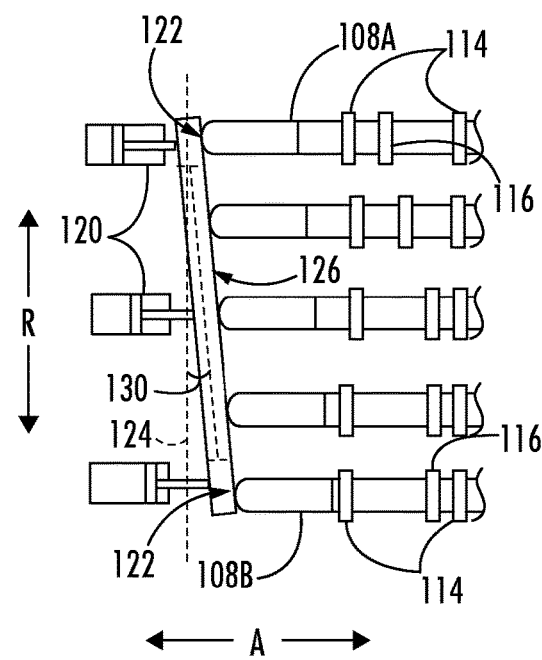
FIG. 11 is a side, schematic view of the non-uniform blade actuator system of FIG. 8 in a first engaged position.

For example, referring now to FIGS. 10 and 11, side, schematic views are depicted of the non-uniform blade actuator system 110 in a neutral position (FIG. 10) and a first engaged position (FIG. 11). In the neutral position, the interface surface 126 of the pitch ring 118 is aligned with the reference plane 124 extending perpendicular to the longitudinal axis 12 of the gas turbine engine 10. With such a configuration, the non-uniform blade actuator system 110 either does not affect the pitch of the plurality fan blades 40 of the fan 38, or affects them uniformly.

For example, as depicted schematically in FIG. 10, and as noted above with reference to the embodiment of FIG. 2, each linkage 108 of the plurality of linkage 108 is movably coupled to the master control 102 through one or more biasing members 112. More specifically, still, for the embodiment shown in FIG. 10, the outer wall 106 of the master control 102 (not shown, see FIG. 2) includes a pair of radial walls 114 spaced from one another along the axial direction A. Each linkage 108 of the plurality of linkages 108 extends through a respective pair of radial walls 114 and includes a stopper 116 positioned between the respective pair of radial walls 114. Each linkage 108 further includes one or more biasing members 112 coupling the stopper 116 to the respective pair of radial walls 114, and in turn, to the master control 102 (not shown, see FIG. 2).

As depicted in FIG. 10, the stoppers 116 of each of the plurality of linkages 108 is positioned at a neutral location with respect to the respective pair of radial walls 114. As such, it will be appreciated that the non-uniform blade actuator system 110, when in the neutral position, does not affect the pitch of the plurality fan blades 40 of the fan 38, or affects them uniformly.

By contrast, as is depicted schematically in FIG. 11, the pitch ring 118 may be moved by the plurality of pitch ring actuators 120 to change an orientation of the pitch ring 118 relative to the reference plane 124. More specifically, the plurality of pitch ring actuators 120 may move the pitch ring 118 such that the interface surface 126 of the pitch ring 118 defines a variable angle 130 relative to the reference plane 124.

As will be appreciated, when moved to the engaged position, as depicted in FIG. 11, the pitch ring 118 of the non-uniform blade actuator system 110 may function in substantially the same manner as the pitch ring 118 of FIG. 6, such that a first pitch of a first fan blade 40A is controlled relative to a second pitch of a second fan blade 40B, and more specifically, such that a pitch of each of the plurality of fan blades 40 is changed based on a circumferential position of the respective fan blade 40, as it rotates in the circumferential direction C (see FIGS. 8 and 9). In such a manner, the non-uniform blade actuator system 110 of FIGS. 8 through 11 may similarly allow for the pitch change mechanism 44 to reduce 1P loads when an airflow provided to or through the fan 38 defines an oblique angle relative to the longitudinal axis 12 of the gas turbine engine 10.

Notably, it will further be appreciated that as the non-uniform blade actuator system 110, and more specifically the pitch ring 118 of the non-uniform blade actuator system 110, defines greater degrees of freedom relative to the embodiment of FIGS. 2 through 7, a pitch change mechanism 44 including the non-uniform blade actuator system 110 of FIGS. 8 through 11 may address airflow defining an oblique angle relative to the longitudinal axis 12 of the gas turbine engine 10 at other operating conditions. For example, the non-uniform blade actuator system 110 described above with reference to FIGS. 8 to 11 may allow for the pitch change mechanism 44 to reduce 1P loads when the gas turbine engine 10 encounters a starboard side crosswind, a port side crosswind, a high angle of attack, an inverse angle of attack (e.g., during a descent), etc.

It will be appreciated, however, that in still other exemplary embodiments, other suitable pitch change mechanisms may be provided.

Figure 12:
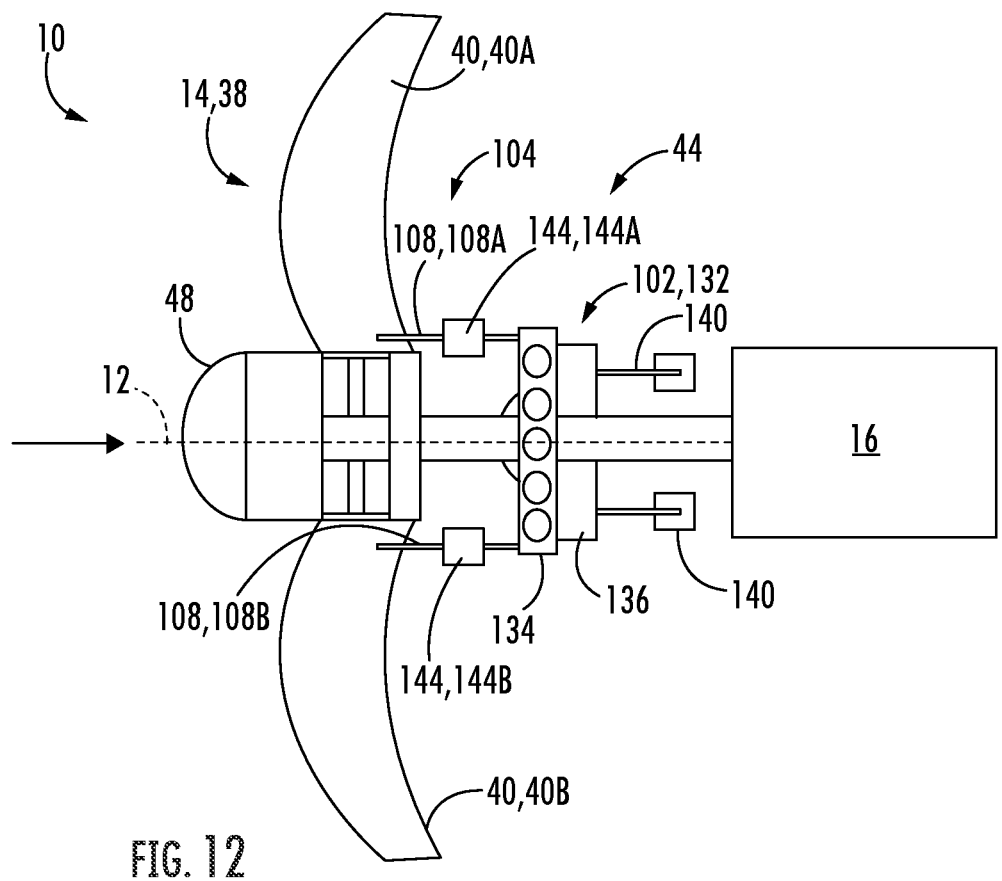
FIG. 12 is a schematic view of a gas turbine engine in accordance with another exemplary embodiment of the present disclosure.

For example, referring now to FIG. 12, a schematic view of a gas turbine engine 10 in accordance with another exemplary embodiment of the present disclosure is provided. The gas turbine engine 10 may be configured in a similar manner as exemplary gas turbine engine 10 described above with reference to FIGS. 1 and 2. Accordingly, the gas turbine engine 10 generally includes a fan section 14 having a fan 38 with a plurality of fan blades 40 and turbomachine 16 configured to rotate the fan 38 of the fan section 14. The gas turbine engine 10 further includes a pitch change mechanism 44 operable with the plurality fan blades 40 for changing a pitch of the plurality of fan blades 40.

Moreover, as with the exemplary embodiments described above, the pitch change mechanism 44 generally includes a master control 102 configured to rotate with the plurality of fan blades 40; a plurality of linkages 108 extending between the master control 102 and the plurality fan blades 40; and a non-uniform blade actuator system 110 operable with one or more of the plurality of linkages 108 to control a first pitch of a first fan blade 40A relative to a second pitch of a second fan blade 40B.

However, for the embodiment depicted, the master control 102 of the pitch change mechanism 44 includes a control plate assembly 132 having a rotating plate 134 configured to rotate with the plurality fan blades 40 and a static plate 136 that is stationary relative to the plurality fan blades 40 along the circumferential direction C (i.e., is not configured to rotate with the plurality fan blades 40). The static plate 136 is rotatably coupled to the rotating plate 134.

Figure 13:
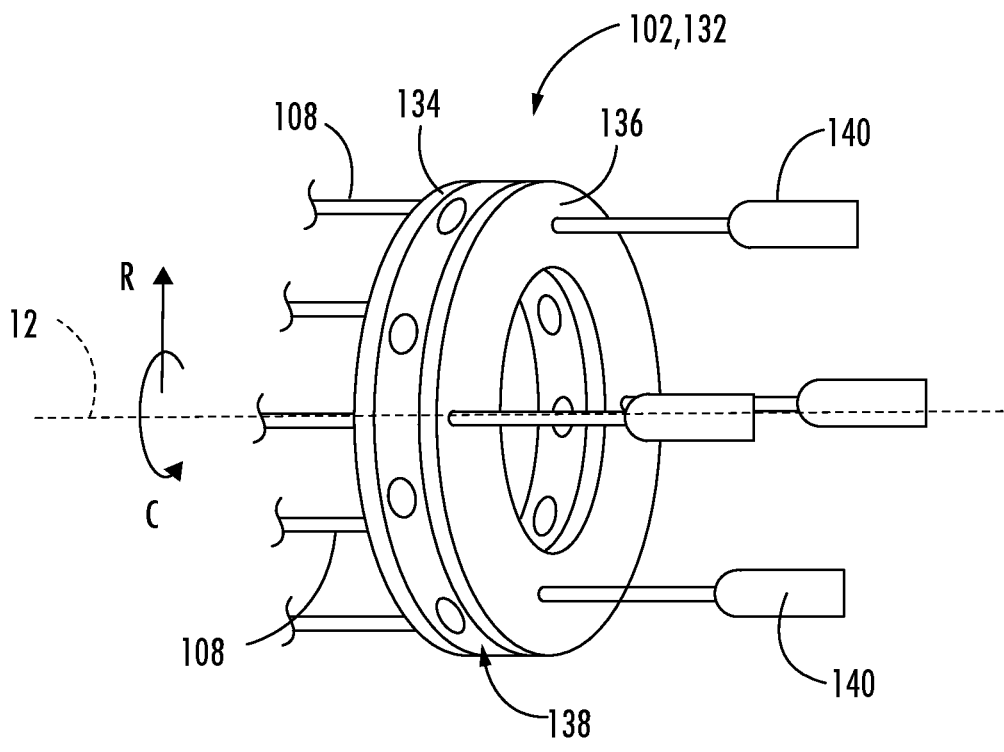
FIG. 13 is a schematic, perspective view of a control plate assembly of a pitch change mechanism of the exemplary gas turbine engine of FIG. 12.

More particularly, referring now also to FIG. 13, a schematic, perspective view is provided of the control plate assembly 132 of the pitch change mechanism 44 of FIG. 12. As noted, the rotating plate 134 is configured to rotate relative to the static plate 136. The control plate assembly 132 further includes a bearing assembly 138 positioned between the rotating plate 134 in the static plate 136 rotatably coupling the rotating plate 134 to the static plate 136. For the embodiment depicted in FIG. 13, the plurality of linkages 108 of the pitch change mechanism 44 are coupled to the rotating plate 134. More specifically, for the embodiment depicted in FIG. 13, each linkage 108 is pivotably coupled to the rotating plate 134 of the control plate assembly 132. Such may facilitate the movement of the control plate assembly 132 described below.

The control plate assembly 132 further includes a plurality of control plate actuators 140 coupled to the static plate 136. In particular, for the embodiment shown in FIG. 13, the control plate assembly 132 includes at least three control plate actuators 140, and more specifically, includes four control plate actuators 140. The control plate actuators 140 are configured as linear actuators. In such manner, the control plate actuators 140 may be configured to move the control plate along the longitudinal axis 12 of the gas turbine engine 10.

Figure 14:
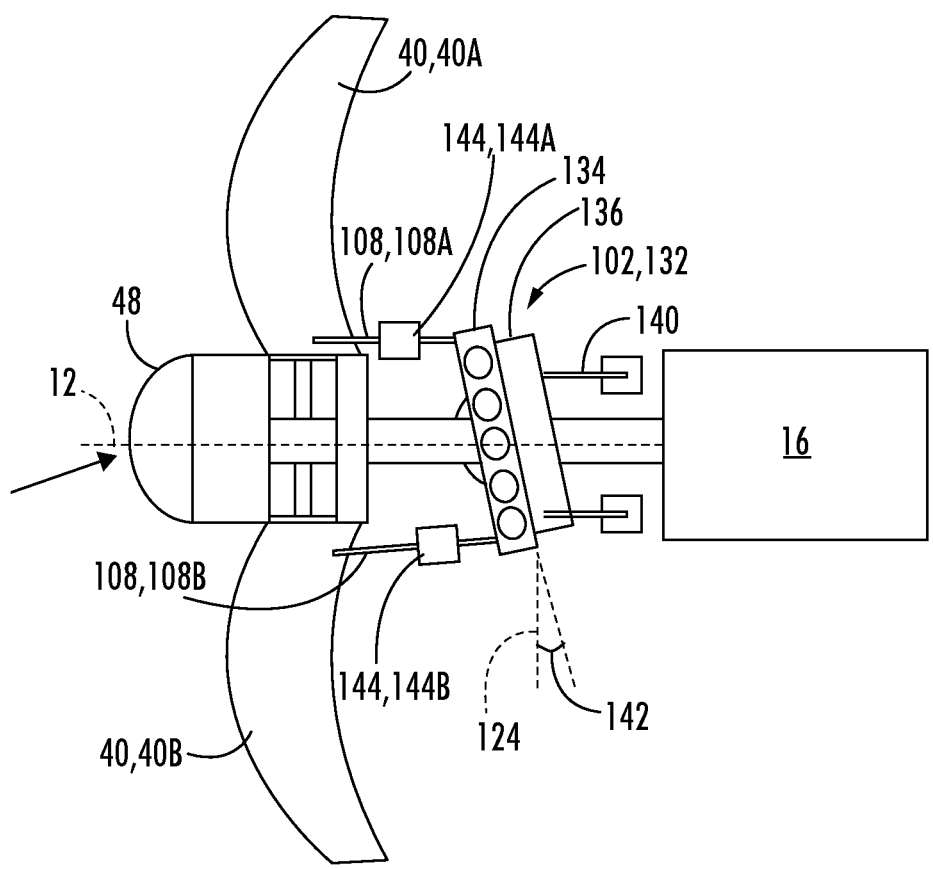
FIG. 14 is a schematic view of the exemplary gas turbine engine of FIG. 12, with the pitch change mechanism moved to a nonuniform pitch angle position.

Moreover, referring now also to FIG. 14, a schematic view of the exemplary gas turbine engine 10 of FIG. 12 is provided, with the pitch change mechanism 44 moved to a nonuniform pitch angle position. In particular, in the embodiment of FIG. 14, the plurality of control plate actuators 140 has moved the static plate 136 of the control plate assembly 132 in a nonuniform manner along the longitudinal axis 12. More specifically, it will be appreciated that the gas turbine engine 10 defines a reference plane 124 perpendicular to the longitudinal axis 12. The control plate actuators 140 may move the static plate 136 to relative to the reference plane 124 to define a variable angle 142 with the reference plane 124. According, when in a neutral position, the angle 142 may be equal to 0°, and by contrast, when in a nonuniform position, the angle 142 may be greater than 0°, such as greater than or equal to 5°, such as greater than or equal to 10°, and less than 45°.

In such a manner, the master control 102, or rather the control plate assembly 132 of the master control 102, may be configured to arrange the fan 38 such that it defines nonuniform pitch angles within the fan blades 40 arranged along the circumferential direction C. For example, in the embodiment of FIGS. 12 through 14, the plurality of fan blades 40 includes a first fan blade 40A and a second fan blade 40B. In the embodiment of FIG. 12, the control plate assembly 132 is positioned at a neutral position, such that it is aligned with the reference plane 124 defined by the gas turbine engine 10. With such a configuration, a first pitch angle 41A (not shown in the view of FIG. 12; see, e.g., embodiment of FIGS. 5, 7) of the first fan blade 40A is equal to a second pitch angle 41B (not shown in the view of FIG. 12; see, e.g., embodiment of FIGS. 5, 7) of the second fan blade 40B. By contrast, in the embodiment of FIG. 14, the control plate assembly 132 is positioned in a nonuniform position, such that it defines an angle 142 greater than zero with the reference plane 124 defined by the gas turbine engine 10. With such a configuration, the first pitch angle 41A of the first fan blade 40A is different than the second pitch angle 41B of the second fan blade 40B.

It will be appreciated that inclusion of a pitch change mechanism 44 including the master control 102 configured as the exemplary control plate assembly 132 of FIGS. 12 and 14 may allow for the fan 38 to address inlet air flows defining an oblique angle relative to the longitudinal axis 12 of the gas turbine engine 10, as described above with reference to the embodiments of FIGS. 1 through 11.

Moreover, for the exemplary embodiment depicted in FIGS. 12 and 14, as briefly noted above, the pitch change mechanism 44 further includes the non-uniform blade actuator system 110. For the embodiment of FIGS. 12 and 14, the non-uniform blade actuator system 110 includes a plurality of blade actuators 144. Each blade actuator 144 may be operable with a single linkage 108 of the plurality of linkages 108 of the pitch change mechanism 44 to individually control a pitch of the respective fan blade 40 of the plurality of fan blades 40.

More specifically, for the embodiment of FIGS. 12 and 14, the plurality of blade actuators 144 includes a first blade actuator 144A operable with a first linkage 108A of the plurality of linkages 108 to control the first pitch of the first fan blade 40A of the plurality fan blades 40. The plurality of blade actuators 144 further includes a second blade actuator 144B operable with a second linkage 108B of the plurality of linkages 108 to control the second pitch of the second fan blade 40B of the plurality fan blades 40. In such a manner, the non-uniform blade actuator system 110 may be configured to control the first pitch of the first fan blade 40A relative to the second pitch of the second fan blade 40B.

In particular, for the embodiment of FIGS. 12 and 14, each blade actuator 144 of the plurality blade actuators 144 is configured as a variable length actuator for varying an effective length of the respective linkage 108.

Figure 15:
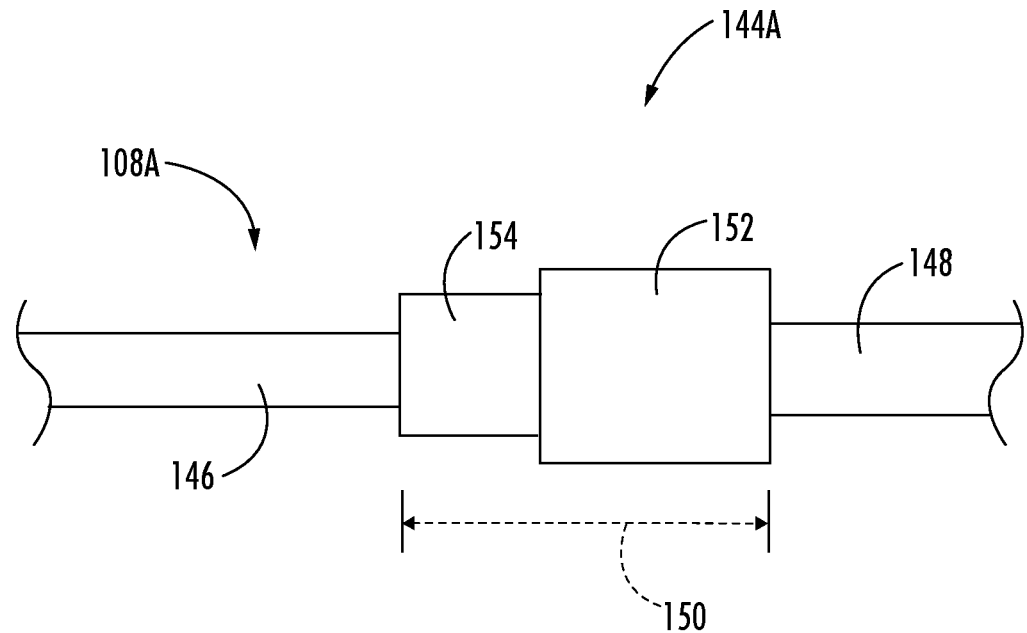
FIG. 15 is a schematic, close-up view of a first blade actuator in accordance with an exemplary embodiment of the present disclosure in a retracted position.
Figure 16:
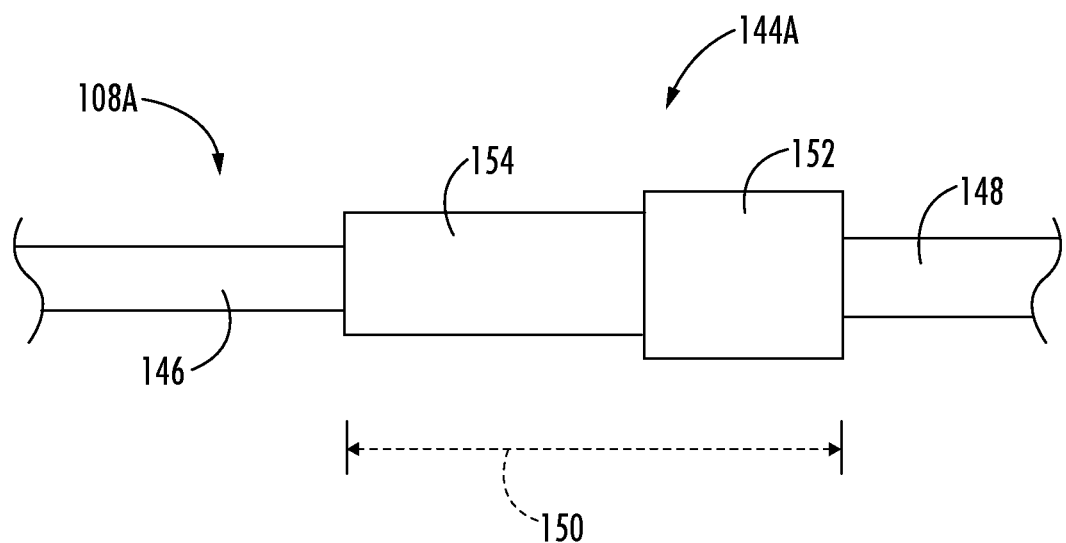
FIG. 16 is a schematic, close-up view of the first blade actuator of FIG. 15 in an extended position.

More specifically, referring now to FIGS. 15 and 16, schematic, close-up views are provided of the first blade actuator 144A of the plurality of blade actuators 144 in a retracted position (FIG. 15) and in an extended position (FIG. 16).

For the embodiment of FIGS. 15 and 16, the first blade actuator 144A is integrated into the first linkage 108A, coupling a first section 146 of the first linkage 108A to a second section 148 of the first linkage 108A. Accordingly, with such a configuration, a length 150 of the first blade actuator 144A directly affects a spacing between the first and second sections 146, 148 of the first linkage 108A, and thus also directly affects an effective overall length of the first linkage 108A. As will further be appreciated, the effective overall length of the first linkage 108A directly affects the first pitch of the first fan blade 40A.

As is depicted, the exemplary first blade actuator 144A of FIGS. 15 and 16 generally includes a housing 152 and a rod 154 moveable relative to the housing 152. The rod 154 may be movable relative to the housing 152 through use of an electric motor, a hydraulic assembly, a pneumatic assembly, or any other suitable mechanism.

When in the retracted position, as is depicted in FIG. 15, the first blade actuator 144A defines a first overall length 150A. Notably, when in the retracted position, the rod 154 is at least partially retracted within the housing 152. By contrast, when in the extended position, as is depicted in FIG. 16, the first blade actuator 144A defines a second overall length 150B. Notably, when in the extended position, the rod 154 is at least partially extended from the housing 152, or rather more extended from the housing 152 as compared to the retracted position. The second overall length 150B is greater than the first overall length 150A, such as at least about 10% greater, at least about 20% greater, at least about 50% greater, and up to about 200% greater. In such a manner, moving the first blade actuator 144A between the retracted position and the extended position may facilitate an effective overall lengthening or shortening of the first linkage 108A, and thus may facilitate a change in the first pitch of the first fan blade 40A.

Referring back to FIGS. 12 and 14, it will be appreciated that each of the plurality of linkages 108 may include a blade actuator 144 configured in a similar manner as the first blade actuator 144A. Each of the plurality of blade actuators 144 may be controlled independently from one another to allow each fan blade 40 of the plurality fan blades 40 to define the desired pitch. The plurality blade actuators 144 may be controlled based on, e.g., a circumferential position of the fan blade 40 to further assist with the pitch change mechanism 44 reducing 1P loads associated with inlet air flows to the fan 38 defining an oblique angle with the longitudinal axis 12.

Further aspects are provided by the subject matter of the following clauses:

A gas turbine engine comprising: a turbomachine comprising a compressor section, a combustion section, and a turbine section arranged in serial flow order; a fan defining a fan axis and comprising a plurality of fan blades rotatable about the fan axis; and a pitch change mechanism operable with the plurality of fan blades, the pitch change mechanism comprising a plurality of linkages, the plurality of linkages including a first linkage coupled to a first fan blade of the plurality of fan blades and a second linkage coupled to a second fan blade of the plurality of fan blades; and a non-uniform blade actuator system operable with one or more of the plurality of linkages to control a pitch of the first fan blade relative to a pitch of the second fan blade.

The gas turbine engine of one or more of the preceding clauses, wherein the pitch change mechanism further comprises a master control rotatable with the plurality of fan blades, wherein the first linkage is coupled to the master control and to the first fan blade, and wherein the second linkage is coupled to the master control and to the second fan blade.

The gas turbine engine of one or more of the preceding clauses, wherein the master control of the pitch change mechanism is configured as a control plate assembly comprising a rotating plate.

The gas turbine engine of one or more of the preceding clauses, wherein the control plate assembly further comprises a static plate rotatably coupled to the rotating plate.

The gas turbine engine of one or more of the preceding clauses, wherein the fan defines a reference plane perpendicular to the fan axis, wherein the static plate is moveable relative to the reference plane.

The gas turbine engine of one or more of the preceding clauses, wherein each linkage of the plurality of linkages is pivotably coupled to the master control.

The gas turbine engine of one or more of the preceding clauses, wherein each linkage of the plurality of linkages is moveably coupled to the master control through one or more biasing members.

The gas turbine engine of one or more of the preceding clauses, wherein the non-uniform blade actuator system comprises a pitch ring slidably engaged with the plurality of linkages.

The gas turbine engine of one or more of the preceding clauses, wherein the gas turbine engine defines a reference plane perpendicular to the fan axis, wherein the non-uniform blade actuator system further comprises a plurality of pitch ring actuators configured to change an orientation of the pitch ring relative to the reference plane.

The gas turbine engine of one or more of the preceding clauses, wherein the gas turbine engine defines a reference plane perpendicular to the fan axis, wherein the non-uniform blade actuator system further comprises one or more pitch ring actuators configured to move the pitch ring linearly along the fan axis in a uniform manner relative to the reference plane.

The gas turbine engine of one or more of the preceding clauses, wherein the master control comprises a linear actuator configured to engage each link of the plurality of linkages simultaneously.

The gas turbine engine of one or more of the preceding clauses, wherein the non-uniform blade actuator system comprises a plurality of blade actuators, the plurality of blade actuators including a first blade actuator operable with the first linkage to control the pitch of the first fan blade and a second blade actuator operable with the second linkage to control the pitch of the second fan blade.

The gas turbine engine of one or more of the preceding clauses, wherein each blade actuator is operable with a single linkage of the plurality of linkages to individually control a pitch of a respective fan blade of the plurality of fan blades.

The gas turbine engine of one or more of the preceding clauses, wherein each blade actuator of the plurality of blade actuators is configured as a variable length actuator for varying an effective length of the respective linkage.

The gas turbine engine of one or more of the preceding clauses, wherein each blade actuator of the plurality of blade actuators is configured as a linear actuator.

The gas turbine engine of one or more of the preceding clauses, wherein the fan is configured as a forward thrust fan.

A pitch change mechanism for a gas turbine engine having a turbomachine and a fan, the fan including a plurality of fan blades, the pitch change mechanism comprising: a plurality of linkages, the plurality of linkages including a first linkage configured to be coupled to a first fan blade of the plurality of fan blades and a second linkage configured to be coupled to a second fan blade of the plurality of fan blades; and a non-uniform blade actuator system operable with one or more of the plurality of linkages to control a pitch of the first fan blade relative to a pitch of the second fan blade.

The pitch change mechanism of one or more of the preceding clauses, wherein the pitch change mechanism further comprises a master control configured to rotate with the plurality of fan blades when the pitch change mechanism is installed in the gas turbine engine, wherein the first linkage is further coupled to the master control, and wherein the second linkage is also further coupled to the master control.

The pitch change mechanism of one or more of the preceding clauses, wherein each linkage of the plurality of linkages is pivotably coupled to the master control.

The pitch change mechanism of one or more of the preceding clauses, wherein each linkage of the plurality of linkages is moveably coupled to the master control through one or more biasing members.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:
 a turbomachine comprising a compressor section, a combustion section, and a turbine section arranged in serial flow order;
 a fan defining a fan axis and comprising a plurality of fan blades rotatable about the fan axis; and
 a pitch change mechanism operable with the plurality of fan blades, the pitch change mechanism comprising
  a plurality of linkages, the plurality of linkages including a first linkage coupled to a first fan blade of the plurality of fan blades and a second linkage coupled to a second fan blade of the plurality of fan blades; and
  a non-uniform blade actuator system operable with one or more of the plurality of linkages to control a pitch of the first fan blade relative to a pitch of the second fan blade, the non-uniform blade actuator system including an interface surface having a non-uniform geometry, the interface surface configured to slidably engage with the plurality of linkages.

2. The gas turbine engine of claim 1, wherein the pitch change mechanism further comprises a master control rotatable with the plurality of fan blades, wherein the first linkage is coupled to the master control and to the first fan blade, and wherein the second linkage is coupled to the master control and to the second fan blade.

3. The gas turbine engine of claim 2, wherein the master control of the pitch change mechanism is configured as a control plate assembly comprising a rotating plate.

4. The gas turbine engine of claim 3, wherein the control plate assembly further comprises a static plate rotatably coupled to the rotating plate.

5. The gas turbine engine of claim 4, wherein the fan defines a reference plane perpendicular to the fan axis, wherein the static plate is moveable relative to the reference plane.

6. The gas turbine engine of claim 2, wherein each linkage of the plurality of linkages is pivotably coupled to the master control.

7. The gas turbine engine of claim 2, wherein each linkage of the plurality of linkages is moveably coupled to the master control through one or more biasing members.

8. The gas turbine engine of claim 7, wherein the non-uniform blade actuator system comprises a pitch ring slidably engaged with the plurality of linkages.

9. The gas turbine engine of claim 8, wherein the gas turbine engine defines a reference plane perpendicular to the fan axis, wherein the non-uniform blade actuator system further comprises a plurality of pitch ring actuators configured to change an orientation of the pitch ring relative to the reference plane.

10. The gas turbine engine of claim 8, wherein the gas turbine engine defines a reference plane perpendicular to the fan axis, wherein the non-uniform blade actuator system further comprises one or more pitch ring actuators configured to move the pitch ring linearly along the fan axis in a uniform manner relative to the reference plane.

11. The gas turbine engine of claim 2, wherein the master control comprises a linear actuator configured to engage each linkage of the plurality of linkages simultaneously.

12. The gas turbine engine of claim 1, wherein the non-uniform blade actuator system comprises a plurality of blade actuators, the plurality of blade actuators including a first blade actuator operable with the first linkage to control the pitch of the first fan blade and a second blade actuator operable with the second linkage to control the pitch of the second fan blade.

13. The gas turbine engine of claim 12, wherein each blade actuator is operable with a single linkage of the plurality of linkages to individually control a pitch of a respective fan blade of the plurality of fan blades.

14. The gas turbine engine of claim 13, wherein each blade actuator of the plurality of blade actuators is configured as a variable length actuator for varying an effective length of the respective linkage.

15. The gas turbine engine of claim 14, wherein each blade actuator of the plurality of blade actuators is configured as a linear actuator.

16. The gas turbine engine of claim 1, wherein the fan is configured as a forward thrust fan.

17. A pitch change mechanism for a gas turbine engine having a turbomachine and a fan, the fan including a plurality of fan blades, the pitch change mechanism comprising:
 a plurality of linkages, the plurality of linkages including a first linkage configured to be coupled to a first fan blade of the plurality of fan blades and a second linkage configured to be coupled to a second fan blade of the plurality of fan blades; and
 a non-uniform blade actuator system operable with one or more of the plurality of linkages to control a pitch of the first fan blade relative to a pitch of the second fan blade, the non-uniform blade actuator system including an interface surface having a non-uniform geometry, the interface surface configured to slidably engage with the plurality of linkages.

18. The pitch change mechanism of claim 17, wherein the pitch change mechanism further comprises a master control configured to rotate with the plurality of fan blades when the pitch change mechanism is installed in the gas turbine engine, wherein the first linkage is further coupled to the master control, and wherein the second linkage is also further coupled to the master control.

19. The pitch change mechanism of claim 18, wherein each linkage of the plurality of linkages is pivotably coupled to the master control.

20. The pitch change mechanism of claim 18, wherein each linkage of the plurality of linkages is moveably coupled to the master control through one or more biasing members.

* * * * *